US010528844B2

(12) United States Patent
Sugimura et al.

(10) Patent No.: US 10,528,844 B2
(45) Date of Patent: Jan. 7, 2020

(54) METHOD AND APPARATUS FOR DISTANCE MEASUREMENT

(71) Applicant: FUJITSU LIMITED, Kawasaki-shi, Kanagawa (JP)

(72) Inventors: Masahiko Sugimura, Kawasaki (JP); Susumu Endo, Kawasaki (JP); Hiroaki Takebe, Kawasaki (JP); Takayuki Baba, Kawasaki (JP); Yusuke Uehara, Kawasaki (JP); Yasutaka Moriwaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 15/899,442

(22) Filed: Feb. 20, 2018

(65) Prior Publication Data
US 2018/0247152 A1    Aug. 30, 2018

(30) Foreign Application Priority Data

Feb. 28, 2017  (JP) ................................ 2017-036292

(51) Int. Cl.
G06K 9/46       (2006.01)
G06T 7/73       (2017.01)
G06K 9/62       (2006.01)

(52) U.S. Cl.
CPC .......... G06K 9/4671 (2013.01); G06K 9/6211 (2013.01); G06K 9/6212 (2013.01); G06K 9/6215 (2013.01); G06T 7/73 (2017.01)

(58) Field of Classification Search
CPC .. G06K 9/4671; G06K 9/6211; G06K 9/6215; G06K 9/6212; G06T 7/73

(Continued)

(56) References Cited

U.S. PATENT DOCUMENTS

2006/0013473 A1*  1/2006  Woodfill .................. G06K 9/32
                                                                382/154
2010/0048242 A1*  2/2010  Rhoads ................ G06K 9/6253
                                                                455/556.1

(Continued)

FOREIGN PATENT DOCUMENTS

JP      2013-101423     5/2013
JP      2013-109773     6/2013

(Continued)

OTHER PUBLICATIONS

David G. Lowe, "Distinctive Image Features from Scale-invariant Keypoints", International Journal of Computer Vision, vol. 60, Issue 2, Nov. 2004, pp. 91-110 (20 pages).

(Continued)

Primary Examiner — Amandeep Saini
(74) Attorney, Agent, or Firm — Fujitsu Patent Center

(57) ABSTRACT

There is provided a distance measuring apparatus including a storing unit configured to store a first image and a second image to be compared with one another; and a calculating unit configured to extract a plurality of feature points from each of the first image and the second image, extract a combination of feature points with high stability of feature values amongst the plurality of feature points in the first image and a combination of feature points with high stability of feature values amongst the plurality of feature points in the second image, and output, as bit strings, the feature values associated with the combination extracted from the first image and the feature values associated with the combination extracted from the second image.

7 Claims, 16 Drawing Sheets

(58) Field of Classification Search
USPC .......................................................... 382/106
See application file for complete search history.

(56) References Cited

U.S. PATENT DOCUMENTS

| 2010/0092093 | A1  | 4/2010 | Akatsuka et al. |
| 2012/0143856 | A1  | 6/2012 | Klinkigt et al. |
| 2016/0004927 | A1* | 1/2016 | Yonaha .................... G06K 9/00 382/201 |

FOREIGN PATENT DOCUMENTS

| JP | 2015-118644 | 6/2015 |
| JP | 2016-045837 | 4/2016 |
| WO | 2011/021605 | 2/2011 |

OTHER PUBLICATIONS

Herbert Bay et al., "SURF: Speeded Up Robust Features", Proceedings of the 9th European Conference on Computer Vision (ECCV2006), May 2006, pp. 404-417 (14 pages).

Michael Calonder et al., "BRIEF: Binary Robust Independent Elementary Features", Proceedings of the 11th European Conference on Computer Vision (ECCV2010), Sep. 2010 (15 pages).

Alexandre Alahi et al., "FREAK: Fast Retina Keypoint", Proceedings of the IEEE Conference on Computer Vision and Pattern Recognition (CVPR), Jun. 2012 (10 pages).

Ethan Rublee et al., "ORB: An efficient alternative to SIFT or SURF", Proceedings of the IEEE International Conference on Computer Vision (ICCV), Nov. 2011 (10 pages).

"OpenCV: BRIEF (Binary Robust Independent Elementary Features", webpage, <http://docs.opencv.org/trunk/dc/d7d/tutorial_py_brief.html> (1 page).

Edward Rosten et al., "Faster and better: A Machine Learning Approach to Corner Detection", IEEE Transactions on Pattern Analysis and Machine Intelligence, vol. 32, Issue 1, Jan. 2010 (17 pages).

"OpenCV: FAST Algorithm for Corner Detection", webpage, <http://docs.opencv.org/trunk/df/d0c/tutorial_py_fast.html> (2 pages).

* cited by examiner

EXAMPLE OF IMAGE SEARCH (DETECTION OF MAXIMUM VOTE COUNT)

(DETERMINATION)

- COMPARE MAXIMUM VOTE COUNT WITH THRESHOLD
- MAXIMUM VOTE COUNT > THRESHOLD → DETECTION SUCCESS
- MAXIMUM VOTE COUNT < THRESHOLD → DETECTION FAILURE
- OUTPUT DETECTION RESULT (REFERENCE IMAGE OR FAILURE REPORT)

| k (BIT LOCATION) | PIXEL PAIR COORDINATES ||
|---|---|---|
| | PIXEL A | PIXEL B |
| 1 | s1, t1 | u1, v1 |
| 2 | s2, t2 | u2, v2 |
| 3 | s3, t3 | u3, v3 |
| ⋮ | ⋮ | ⋮ |
| 128 | s128, t128 | u128, v128 |

FIG. 10

| n | COORDINATES | ABUSOLUTE VALUE VECTOR | NORM |
|---|---|---|---|
| 1 | x1, y1 | 10001011⋯ | NR1 |
| 2 | x2, y2 | 10101001⋯ | NR2 |
| 3 | x3, y3 | 00101101⋯ | NR3 |
| ⋮ | ⋮ | ⋮ | ⋮ |
| N | xN, yN | 01100011⋯ | NRN |

101c

Pic#1
Pic#2

FIG. 11

| f | COORDINATES | LOCAL FEATURE VALUE |
|---|---|---|
| 1 | x1, y1 | 101001... |
| 2 | x2, y2 | 100011... |
| 3 | x3, y3 | 001011... |
| ⋮ | ⋮ | ⋮ |
| F | xF, yF | 101101... |

101d

Pic#1
Pic#2

METHOD AND APPARATUS FOR DISTANCE MEASUREMENT

CROSS-REFERENCE TO RELATED APPLICATION

This application is based upon and claims the benefit of priority of the prior Japanese Patent Application No. 2017-036292, filed on Feb. 28, 2017, the entire contents of which are incorporated herein by reference.

FIELD

The embodiments discussed herein are related to a method and apparatus for distance measurement.

BACKGROUND

Image matching technologies have come into widespread use in various fields. For example, technologies for matching images taken with visible light or infrared cameras to template images are used in the facial recognition and biometric authentication fields. In addition, technologies for matching images taken with camera mobile phones or digital cameras to landmark images are also used extensively.

There is an image matching method which, for example, compares a feature value of each feature point (which is hereinafter sometimes referred to as "local feature value") in an input image with local feature values of feature points in a reference image to thereby search for a feature point in the reference image, corresponding to the feature point in the input image. Note that such a feature point in the reference image is termed "corresponding point" and a search for a corresponding point is termed "corresponding point search". A set of corresponding points found through searches are statistically processed, which allows recognition of the presence or location of the reference image within the input image.

Image feature values, such as Scale-Invariant Feature Transform (SIFT), Speeded Up Robust Features (SURF), and Binary Robust Independent Elementary Features (BRIEF), are used for corresponding point searches. For example, BRIEF is characterized by representing local features as sets of bit values (local feature values), each defined according to luminance differences of a plurality of pixel pairs distributed around each feature point. Oriented Fast and Rotated BRIEF (ORB) and Fast Retina Keypoint (FREAK) are examples of image feature values using luminance differences between pixels.

One method proposed to reduce processing load involved in such corresponding point searches is to reuse information on luminance differences calculated previously when image patches associated with a plurality of feature points and having a plurality of pixel pairs arranged therein overlap each other. Another proposed method is directed to integrating a plurality of feature data records calculated from a plurality of query images and outputting the integrated result. Still another proposed method is to speed up matching by narrowing down features detected in an image by eliminating those lying along edges and line contours. Yet another proposed method employs Features from Accelerated Segment Test (FAST) before BRIEF computation to thereby increase processing speed.

See, for example, the following documents:
Japanese Laid-open Patent Publication No. 2016-45837;
Japanese Laid-open Patent Publication No. 2013-101423;
Japanese Laid-open Patent Publication No. 2013-109773;
International Publication Pamphlet No. WO 2011021605;
David G. Lowe, "Distinctive Image Features from Scale-Invariant Keypoints", International Journal of Computer Vision, 60, 2 (2004), pp. 91-110;
H. Bay, T. Tuytelaars, and L. V. Gool, "SURF: Speed Up Robust Features", Proceedings of the European Conference on Computer Vision (ECCV), 2006;
M. Calonder, V. Lepetit, C. Strecha, and P. Fua, "BRIEF: Binary Robust Independent Elementary Features", In Proceedings of the European Conference on Computer Vision (ECCV), 2010;
Alexandre Alahi, Raphael Ortiz, Pierre Vandergheynst, "FREAK: Fast Retina Keypoint", In Proceedings of the IEEE Conference on Computer Vision and Pattern Recognition (CVPR), 2012;
E. Rublee, V. Rabaud, K. Konolige, and G. Bradski, "ORB: An Efficient Alternative to SIFT or SURF", In Proceedings of the IEEE International Conference on Computer Vision (ICCV), 2011; and
OpenCV: BRIEF (Binary Robust Independent Elementary Features), webpage, URL: docs.opencv.org/trunk/dc/d7d/tutorial_py_brief.html.

When corresponding point searches are implemented using local feature values based on signs associated with differences between pixels, such as BRIEF, erroneous matching tends to take place in flat and smooth image regions with minimal differences in colors and brightness and image regions including fine lines, for example. In a flat and smooth image region, for example, each sign associated with the difference between pixels may be easily changed due to the influence of noise or lighting variations. Also in an image region including fine lines, each sign associated with the difference between pixels would change depending on whether one of the paired pixels happens to lie on a fine line. Removing such unstable feature points likely to cause erroneous matching and selecting robust feature points less likely to produce incorrect matching offer a contribution to improved image recognition accuracy.

SUMMARY

According to an aspect, a non-transitory computer-readable storage medium storing a computer program that causes a computer to perform a procedure including: extracting a plurality of feature points from each of a first image and a second image to be compared with one another; extracting a combination of feature points with high stability of feature values amongst the plurality of feature points in the first image and a combination of feature points with high stability of feature values amongst the plurality of feature points in the second image; and outputting, as bit strings, the feature values associated with the combination extracted from the first image and the feature values associated with the combination extracted from the second image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of a pixel pair table;

FIG. 10 illustrates an example of a candidate table;

FIG. 11 illustrates an example of a feature point table;

DESCRIPTION OF EMBODIMENTS

Figure 1:
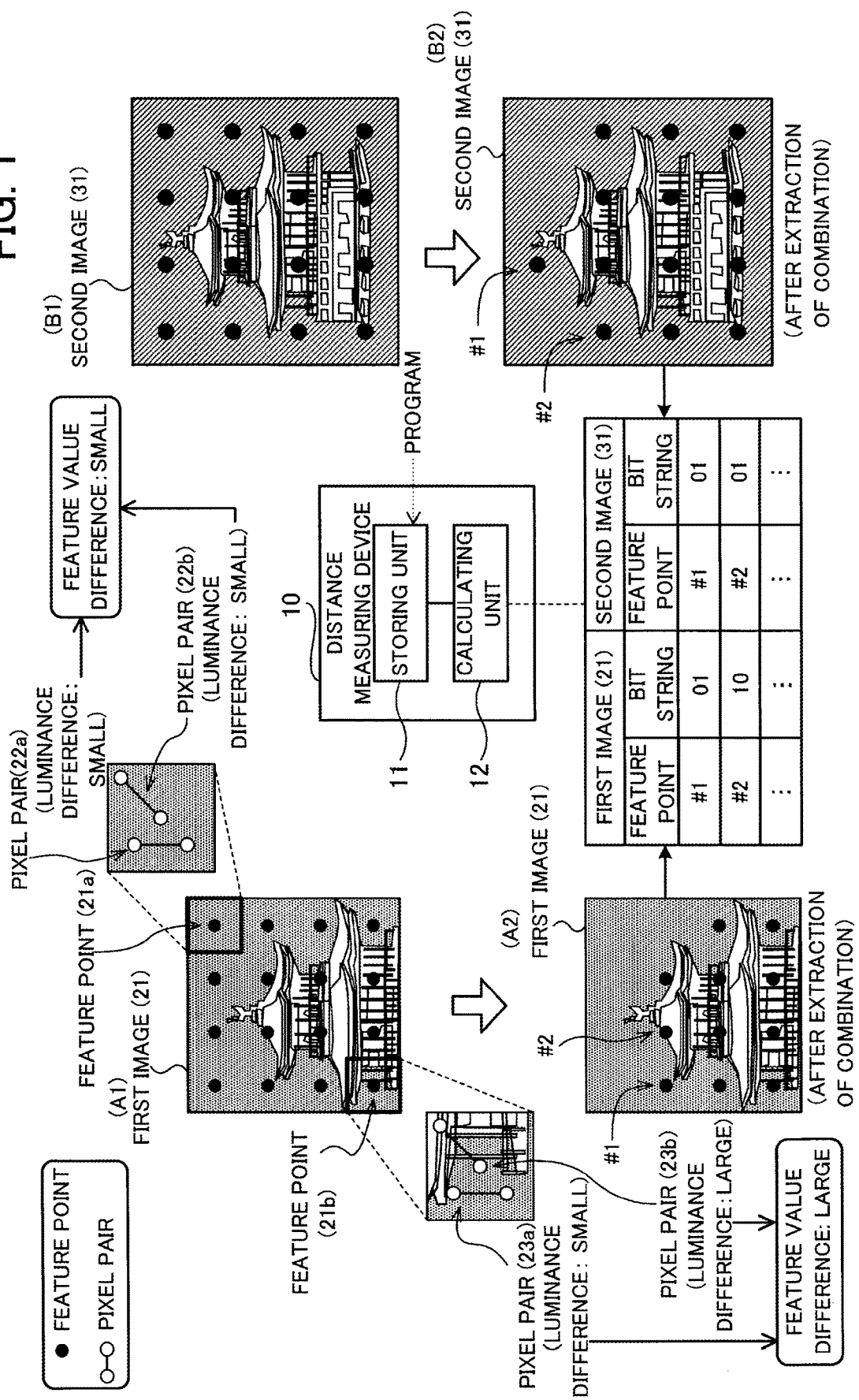
FIG. 1 illustrates an example of a distance measuring device according to a first embodiment.

Several embodiments will be described below with reference to the accompanying drawings. In the following description and the accompanying drawings, like reference numerals refer to like elements having substantially the same functions, and a repeated description thereof may be omitted.

(a) First Embodiment

A first embodiment is described with reference to FIG. 1. The first embodiment is directed to a method for extracting image feature values well-suited to image recognition from images to be compared with one another. FIG. 1 illustrates an example of a distance measuring device according to the first embodiment. Note that a distance measuring device 10 of FIG. 1 is an example of the distance measuring device according to the first embodiment.

The distance measuring device 10 includes a storing unit 11 and a calculating unit 12, as illustrated in FIG. 1. The storing unit 11 is a volatile storage device such as random access memory (RAM), or a non-volatile storage device such as a hard disk drive (HDD) or flash memory. The calculating unit 12 is a processor such as a central processing unit (CPU), a digital signal processor (DSP), an application specific integrated circuit (ASIC), or a field programmable gate array (FPGA). The calculating unit 12 executes a program stored, for example, in the storing unit 11 or different memory.

The storing unit 11 stores therein a first image 21 and a second image 31 to be compared with one another. The calculating unit 12 extracts a plurality of feature point candidates from each of the first image 21 and the second image 31. For example, as illustrated in (A1), the calculating unit 12 distributes feature points (black circles in the figure) in the first image 21 at even intervals as the feature point candidates. The calculating unit 12 also distributes, as illustrated in (B1), feature points (black circles in the figure) in the second image 31 at even intervals as the feature point candidates. Note here that the arrangement rule for the feature point candidates in each image is not limited to the example of FIG. 1.

The calculating unit 12 extracts, amongst the feature points in the first image 21, a combination of feature points with high stability of feature values. For example, the calculating unit 12 sets pixel pairs 22a and 22b around a feature point 21a, and then calculates the luminance difference between pixels of the pixel pair 22a as well as the luminance difference between pixels of the pixel pair 22b. Subsequently, the calculating unit 12 evaluates the feature value stability based on the magnitude of each of the calculated luminance differences (represented, for example, by an absolute value). If the absolute value of the luminance difference is small, the sign of the luminance difference may change when the positions of the paired pixels are only slightly shifted. That is, the feature value stability is low in this case. On the other hand, if the absolute value of the luminance difference is large, the sign of the luminance difference is less likely to change even if the positions of the paired pixels are slightly shifted. In this case, therefore, high feature value stability is provided.

The calculating unit 12 evaluates the feature value stability for each of all the feature points extracted as the feature point candidates, and then selects feature points with high stability of feature values to extract them as a combination of feature points with high stability of feature values. For example, the calculating unit 12 selects a predetermined number of feature points in descending order of the feature value stability. Alternatively, the calculating unit 12 may select feature points whose feature value stability is higher than a predetermined threshold. In the example of FIG. 1, the feature point 21a fails to be selected while a feature point 21b evaluated based on pixel pairs 23a and 23b is selected as a feature point with high feature value stability. In the same manner, the calculating unit 12 extracts, amongst the feature points in the second image 31, a combination of feature points with high stability of feature values.

For each of the extracted combinations, the calculating unit 12 outputs the feature values associated with the combination as bit strings. For example, with respect to each of the feature points with high stability of feature values (feature points #1, #2, and so on in the example of FIG. 1), the calculating unit 12 obtains bit values each based on the sign of the luminance difference corresponding to a pixel pair of the feature point, and then aligns the obtained bit values to form a bit string and outputs the bit string.

The use of such bit strings described above allows calculation of the degree of similarity between a feature point in the first image 21 and a feature point in the second image 31. In addition, statistically processing the degrees of similarity between feature points enables calculation of the degree of similarity, positional correspondence, or the like, between the first image 21 and the second image 31.

Taking the degree of feature value stability into consideration in the above-described manner allows elimination of feature points located in flat and smooth regions or regions with a lot of paired pixels set across fine lines, thereby reducing the risk of erroneous matching. Note that the number of pixel pairs for each feature point is two in the example of FIG. 1 for the purpose of illustration; however, a larger number of pixel pairs (for example, 128 pixel pairs) may be used.

Further, the above-described method is applicable to BRIEF and improved BRIEF. In that case, a binary vector corresponding to a plurality of pixel pairs is generated, in which each bit value is set to 1 if an absolute value of the luminance difference of a corresponding pixel pair is greater than a threshold and to 0 if it is less than the threshold. Then, the norm of the binary vector is used to represent the above-described degree of feature value stability, which allows selection of well-suited feature points. The first embodiment has been described thus far.

(b) Second Embodiment

The second embodiment is directed to a method for selecting feature points well-suited to BRIEF or the like, which adopts feature value representation using differences in luminance values to thereby reduce the risk of erroneous matching in corresponding point searches.

(b-1) Hardware

Figure 2:
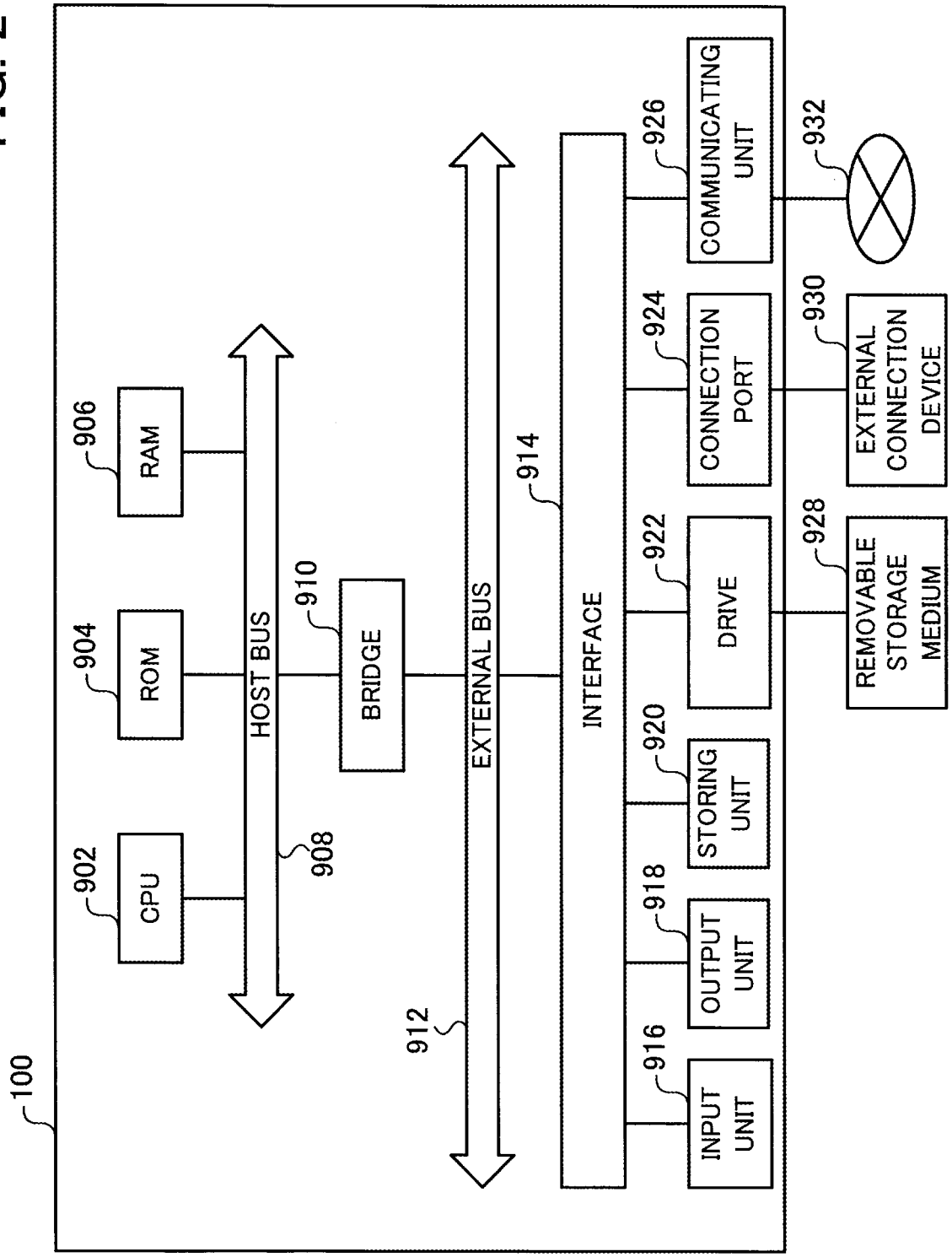
FIG. 2 illustrates an example of hardware capable of implementing functions of an information processor according to a second embodiment.

The method according to the second embodiment may be implemented, for example, using hardware of an information processor 100 represented in FIG. 2. FIG. 2 illustrates an example of hardware capable of implementing functions of the information processor according to the second embodiment. In addition, the functions of the information processor 100 may be implemented by controlling the hardware of FIG. 2 with the use of a computer program. As illustrated in FIG. 2, the hardware mainly includes a CPU 902, read only memory (ROM) 904, RAM 906, a host bus 908, and a bridge 910. The hardware also includes an external bus 912, an interface 914, an input unit 916, an output unit 918, a storing unit 920, a drive 922, a connection port 924, and a communicating unit 926.

The CPU 902 functions, for example, as an arithmetic processing unit or a control device, and exercises control over all, or a part of, operations of the individual structural elements based on various programs stored in the ROM 904, the RAM 906, the storing unit 920, or a removable storage medium 928. The ROM 904 is an example of a memory unit for storing, for example, programs to be loaded into the CPU 902 and data to be used for calculation. The RAM 906 temporarily or permanently stores therein, for example, programs to be loaded into the CPU 902 as well as various parameters to change in the execution of the programs.

These structural elements are connected to each other, for example, via the host bus 908 capable of high-speed data transmission. On the other hand, the host bus 908 is connected, for example, through the bridge 910 to the external bus 912 with a relatively low data transmission speed. The input unit 916 is, for example, a mouse, a keyboard, a touch panel, a touch-pad, buttons, switches, levers or the like. Further, the input unit 916 may be a remote controller capable of transmitting a control signal using infrared or other radio waves.

The output unit 918 is, for example, a display device such as a cathode ray tube (CRT), a liquid crystal display (LCD), a plasma display panel (PDP), or an electro-luminescence display (ELD). Further, an audio output device, such as a speaker or headphones, or a printer may be employed as the output unit 918. That is, the output unit 918 is a device capable of outputting information visually or audibly.

The storing unit 920 is a device for storing therein various types of data. The storing unit 920 is, for example, a magnetic storage device such as a HDD, or alternatively may be a semiconductor storage device such as a solid state drive (SSD) and a RAM disk, an optical storage device, or a magneto-optical storage device.

The drive 922 is a device for reading information recorded on the removable storage medium 928 and writing information to the removable storage medium 928. The removable storage medium 928 is, for example, a magnetic disk, an optical disk, a magneto-optical disk, or semiconductor memory. The removable storage medium 928 may store a program used to control operations of the information processor 100.

The connection port 924 is a port for connecting an external connection device 930, and is, for example, a universal serial bus (USB) port, an Institute of Electrical and Electronics Engineers (IEEE)-1394 port, a small computer system interface (SCSI), an RS-232C port, or an optical audio terminal. The external connection device 930 is, for example, a printer.

The communicating unit 926 is a communication device used to connect with a network 932. The communicating unit 926 is, for example, a wired or wireless local area network (LAN) communication circuit, a wireless USB (WUSB) communication circuit, an optical communication circuit or router, an Asymmetric Digital Subscriber Line (ADSL) communication circuit or router, or a mobile network communication circuit. The network 932 connected to the communicating unit 926 is a network connected with a wire or wirelessly, and is, for example, the Internet, a LAN, a broadcasting network, or a satellite communication link.

Examples of the information processor 100 include a mobile phone, a smartphone, a digital camera, a personal computer, an application server, and a content management system. The functions of the information processor 100 may be implemented employing a plurality of computers. For example, an applicable system may be composed of a terminal unit for performing a process on one image used for image comparison; and a server device connected to the terminal unit via a network and performing a process on the other image as well as a process of corresponding point searches.

Figure 3:
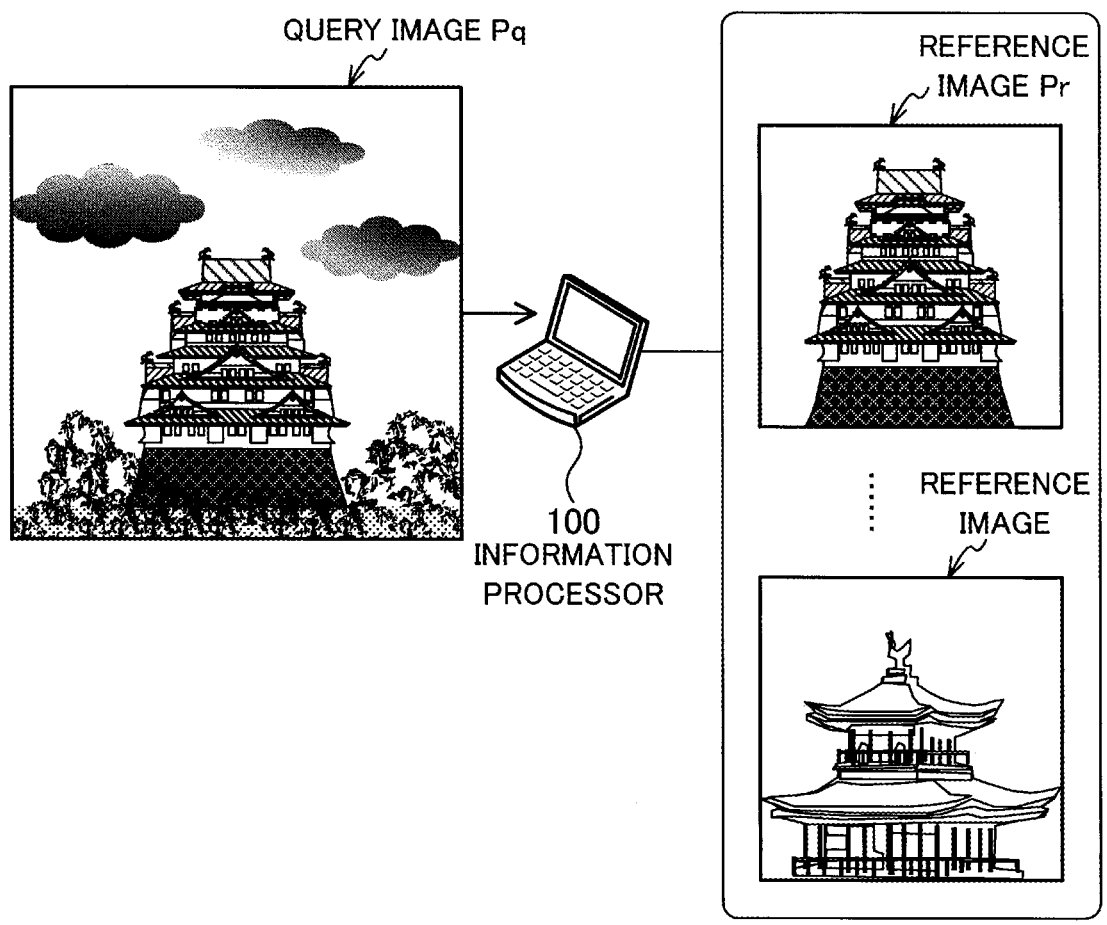
FIG. 3 illustrates an image search performed by the information processor according to the second embodiment.

Making use of the hardware of the information processor 100 of FIG. 2 allows, for example, implementation of an image search function represented in FIG. 3. FIG. 3 illustrates an image search performed by the information processor according to the second embodiment. As illustrated in FIG. 3, the information processor 100 has a plurality of reference images. A query image Pq to be checked against the plurality of reference images is input to the information processor 100. Upon the input of the query image Pq, the information processor 100 calculates the degree of similarity between the query image Pq and each of the reference images, and then outputs a reference image with high similarity (for example, a reference image Pr) as a result of the image search.

In performing the above-described image search, the information processor 100 carries out a process of corresponding point searches using, for example, BRIEF or binary local features similar to BRIEF. Note that a case of applying BRIEF is described in the following description as an example for the purpose of illustration. In order to improve the accuracy of the corresponding point searches, the information processor 100 extracts feature points well-suited to local features such as BRIEF, and performs the above-described image search using the extracted feature points.

(b-2) Example of Image Search

An image search process is described with an example of checking the query image Pq against the reference image Pr, in reference to FIGS. 4 to 7. The image search process mainly includes extraction of a feature value from the reference image Pr; extraction of a feature value from the query image Pq; searches for corresponding points; and detection of the similarity and positional correspondence between the images Pr and Pq using a statistical technique (for example, polling). These steps are described in sequence below.

[Extraction of Feature Value from Reference Image Pr]

Figure 4:
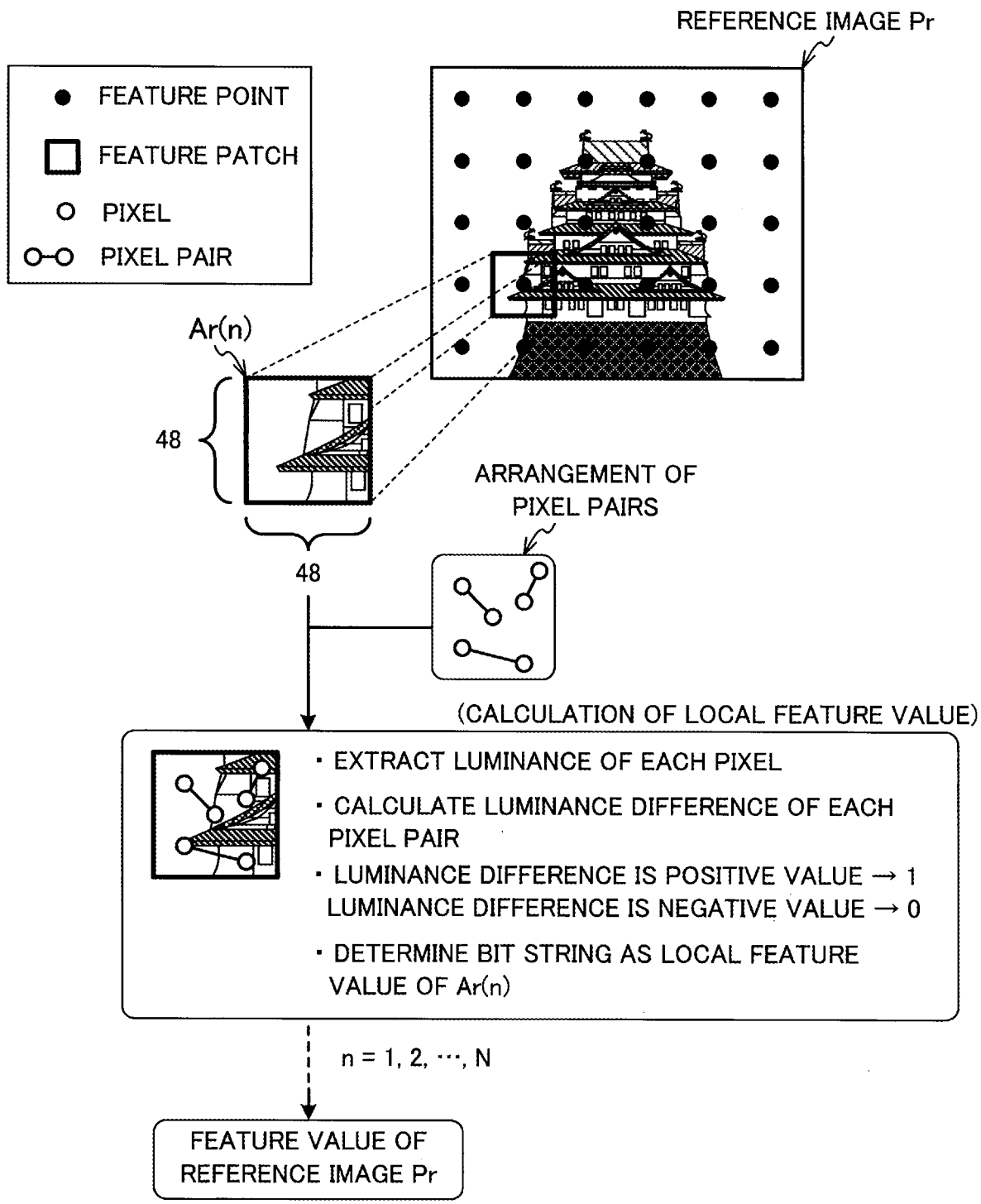
FIG. 4 illustrates an image search process (feature value extraction from a reference image)

First described is the step of extracting a feature value from the reference image Pr, with reference to FIG. 4. FIG. 4 illustrates the image search process (the feature value extraction from the reference image). First, a plurality of feature points are distributed in the reference image Pr. In this regard, the feature points may be arranged, for example, at even intervals. In the example of FIG. 4, black circles denote the feature points. The feature value of the reference image Pr is represented by a combination of local feature values at the individual feature points. Each local feature value is calculated based on luminance differences of pixel pairs set in a local image patch defined with respect to a corresponding feature point (feature patch). Note that each feature patch is, for example, a rectangular patch with a size of pixels by 48 pixels with its center at the corresponding feature point.

For example, the local feature value of a feature patch $Ar(n)$ defined with respect to the $n^{th}$ feature point is represented by a bit string corresponding to a plurality of pixel pairs set in the feature patch $Ar(n)$. The arrangement of the pixel pairs is set in advance. The number of pixel pairs (for example, 128) corresponds to the length of the bit string (e.g. 128 bits) representing the local feature value. In calculating the local feature value, the luminance of each pixel of each pixel pair is first extracted. Then, the luminance difference of each pixel pair is calculated.

Note that, in the case of defining a value obtained by subtracting luminance LB of a pixel B from luminance LA of a pixel A, (LA−LB), as the luminance difference, a correspondence relationship indicating which one of the paired pixels corresponds to the pixel A while the other corresponds to the pixel B is defined with respect to each pixel pair.

Subsequently, a bit value is calculated for each pixel pair, where the bit value is set to 1 if the luminance difference is a positive value and to 0 if the luminance difference is a negative value. With this calculation, a bit string representing the local feature value of the feature patch $Ar(n)$ is obtained.

In the case where N feature points are distributed in the reference image Pr, the local feature value of the feature patch $Ar(n)$ is calculated for each value of n=1, 2, . . . , N in the same manner as described above. Then, a combination of the local feature values corresponding to the individual feature points is defined as the feature value of the reference image Pr. In this manner, the feature value of the reference image Pr is extracted.

[Extraction of Feature Value from Query Image Pq]

Figure 5:
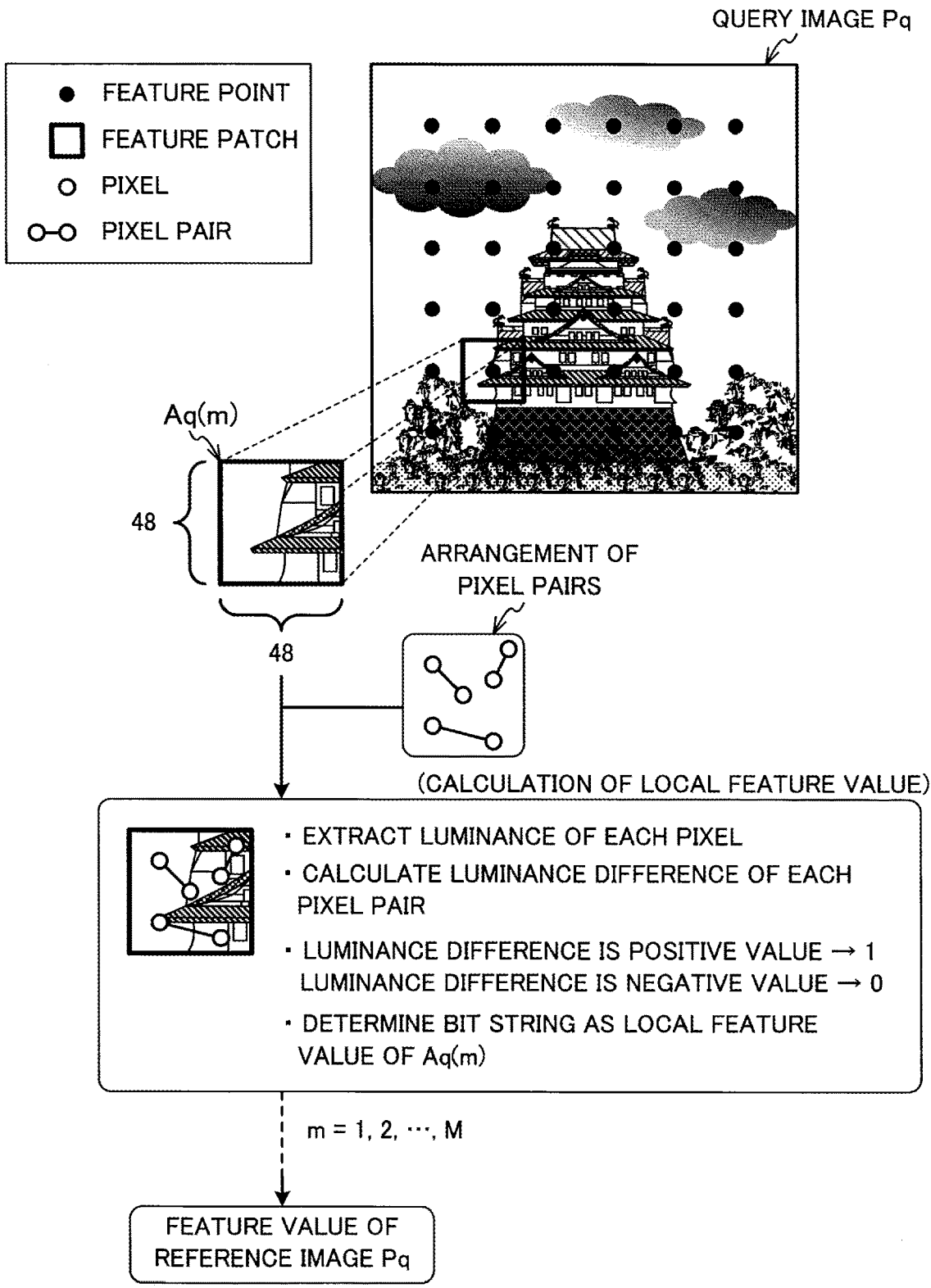
FIG. 5 illustrates the image search process (feature value extraction from a query image)

Next described is the step of extracting a feature value from the query image Pq, with reference to FIG. 5. FIG. 5 illustrates the image search process (the feature value extraction from the query image). First, a plurality of feature points are distributed in the query image Pq. In this regard, the feature points may be arranged, for example, at even intervals. In the example of FIG. 5, black circles denote the feature points. The feature value of the query image Pq is represented by a combination of local feature values at the individual feature points. Each local feature value is calculated based on luminance differences of pixel pairs set in a local image patch defined with respect to a corresponding feature point (feature patch). Note that each feature patch is, for example, a rectangular patch with a size of pixels by 48 pixels with its center at the corresponding feature point.

For example, the local feature value of a feature patch $Aq(m)$ defined with respect to the $m^{th}$ feature point is represented by a bit string corresponding to a plurality of pixel pairs set in the feature patch $Aq(m)$. In calculating the local feature value, the luminance of each pixel of each pixel pair is first extracted. Then, the luminance difference of each pixel pair is calculated. Subsequently, a bit value is calculated for each pixel pair, where the bit value is set to 1 if the luminance difference is a positive value and to 0 if the luminance difference is a negative value. With this calculation, a bit string representing the local feature value of the feature patch $Aq(m)$ is obtained.

In the case where M feature points are distributed in the query image Pq, the local feature value of the feature patch $Aq(m)$ is calculated for each value of m=1, 2, . . . , M in the same manner as described above. Note that N may be equal to M (i.e., N=M). Then, a combination of the local feature values corresponding to the individual feature points is defined as the feature value of the query image Pq. In this manner, the feature value of the query image Pq is extracted.

[Corresponding Point Searches, Polling, and Determination]

Figure 6:
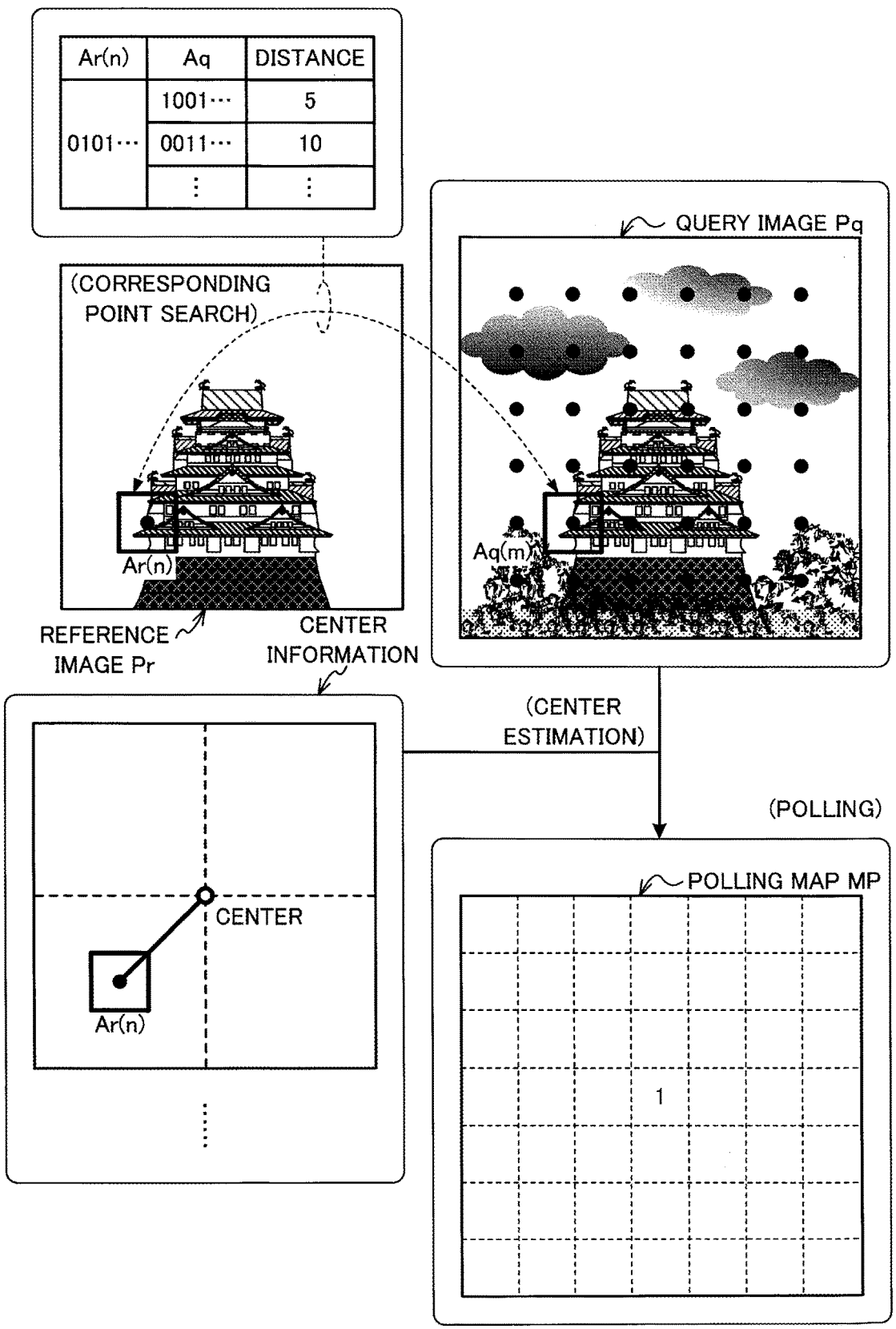
FIG. 6 illustrates the image search process (a corresponding point search and polling)

Next described are the step of searching for feature points corresponding between the reference image Pr and the query image Pq (corresponding point searches) and the step of identifying positional correspondence between the two images using a statistical technique (polling) based on results obtained from the corresponding point searches, with reference to FIG. 6. FIG. 6 illustrates the image search process (the corresponding point searches and polling). An example described next is directed to a corresponding point search where a search is made for a feature point in the query image Pq, corresponding to the $n^{th}$ feature point in the reference image Pr.

The bit string representing the local feature value of each feature point in the reference image Pr is already obtained by the method represented in FIG. 4. In like fashion, the bit string representing the local feature value of each feature point in the query image Pq is already obtained by the method represented in FIG. 5. Therefore, it is possible to calculate a distance between these feature points using the two bit strings. For example, the two bit stings are compared for each bit location, and the count of bit values different in the two bit strings is used as the distance. Note here that the shorter the distance is, the greater the similarity between the feature points.

In the example of FIG. 6, the above-described calculation is made for the distance between the $n^{th}$ feature point in the reference image Pr and each feature point in the query image Pq, and a feature point with the minimum calculated distance (here, the feature point of the feature patch $Aq(m)$) is extracted from the query image Pq. After the extraction of the corresponding feature point in the query image Pq, a location, within the query image Pq, corresponding to the center of the reference image Pr is estimated with reference to the extracted feature point (center estimation).

The positional relationship between the center of the reference image Pr and each feature point in the reference image Pr (center information) is already known. Using the positional relationship, the location, within the query image Pq, corresponding to the center of the reference image Pr (estimated center) is identified on the assumption that the feature patch $Ar(n)$ matches the feature patch $Aq(m)$. Subsequently, polling is performed using a polling map MP, with fine grids, of the same size as that of the query image Pq. The polling map MP is map information used to count the number of times each grid is determined to be the estimated center.

Figure 7:
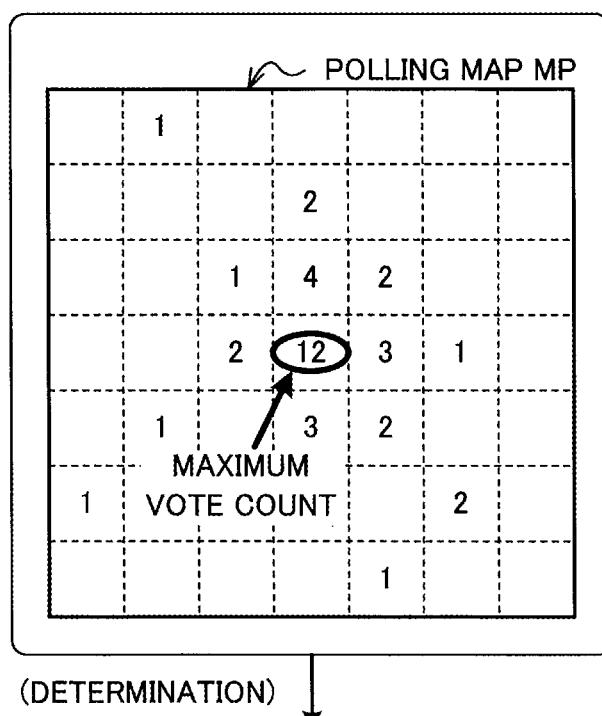
FIG. 7 illustrates the image search process (detection and determination of a maximum vote count)

Note that the above-described center estimation is carried out for each feature point in the reference image Pr. For each feature point, a vote is cast for a grid in the polling map MP, corresponding to the estimated center associated with the feature point (that is, the value of count for the grid is increased by 1). After repeating the center estimation and polling steps for all the feature points in the reference image Pr, the polling map MP represented in FIG. 7 is obtained. FIG. 7 illustrates the image search process (the detection and determination of the maximum vote count). After the polling is completed, the maximum vote count is detected from the polling map MP and then compared to a preset threshold for determination.

If the maximum vote count is greater than the threshold, the detection of the reference image Pr similar to the query image Pq is determined to be successful. On the other hand, if the maximum vote count is less than the threshold, the detection of the reference image Pr similar to the query image Pq is determined to have failed. Note that, if the maximum vote count is equal to the threshold, the detection is determined to be, for example, successful. When the detection is successful, the reference image Pr similar to the query image Pq is output as a detection result. On the other hand, when the detection ends in failure, no output is returned as the detection result or error information indicating detection failure is output.

The above-described method allows a search for the reference image Pr similar to the query image Pq. Note however that the processing load remains high in the above example because all combinations of the individual feature points distributed in the reference image Pr and the query image Pq need to be investigated. In addition, because each local feature is represented by using luminance differences of corresponding pixel pairs, the feature values in flat and smooth image regions of each image are subject to change due to the influence of noise or lighting variations. Further, local features in image regions including fine lines may vary significantly depending on the arrangement of pixel pairs. Therefore, distributing feature points in such image regions results in an increased risk of erroneous matching.

Performing preprocessing using an edge extractor or corner detector (such as FAST) before BRIEF computation may be considered as one way of narrowing down feature points to be used for the corresponding point searches; however, while contributing to a reduction in processing load, this does not always extract feature points well-suited to BRIEF. Therefore, the above-described risk of erroneous matching is not reduced by performing preprocessing such as edge extraction or corner detection (using FAST). On the other hand, the information processor 100 according to the second embodiment provides a function of extracting feature points well-suited to BRIEF or binary local features similar to BRIEF.

(b-3) Functions of Information Processor

Figure 8:
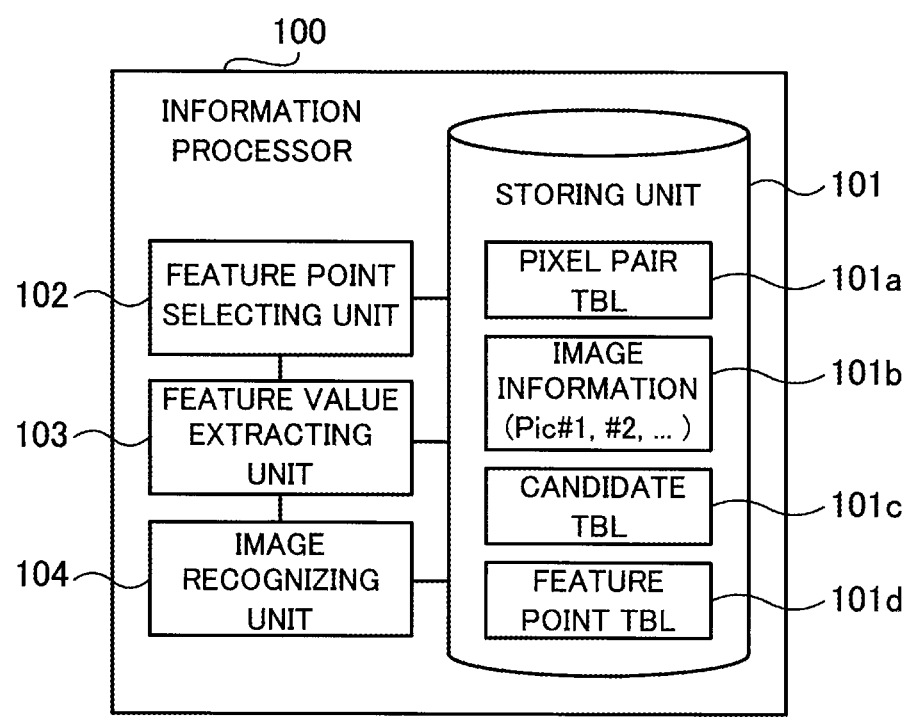
FIG. 8 is a block diagram illustrating an example of functions of the information processor according to the second embodiment.

The information processor 100 includes functions represented in FIG. 8. FIG. 8 is a block diagram illustrating an example of functions of the information processor according to the second embodiment. The information processor 100 includes a storing unit 101, a feature point selecting unit 102, a feature value extracting unit 103, and an image recognizing unit 104, as illustrated in FIG. 8. The function of the storing unit 101 is implemented using, for example, the above RAM 906 or storing unit 920. The functions of the feature point selecting unit 102, the feature value extracting unit 103, and the image recognizing unit 104 may be implemented using, for example, the above CPU 902.

The storing unit 101 stores therein information of a pixel pair table 101a; image information 101b; information of a candidate table 101c; and information of a feature point table 101d. Note that a table is sometimes denoted by TBL in figures for notational convenience. The pixel pair table 101a is information indicating positions of paired pixels distributed in a feature patch. For example, the pixel pair table 101a includes information represented in FIG. 9. FIG. 9 illustrates an example of the pixel pair table. The pixel pair table 101a of FIG. 9 includes information mapping between each bit location k within the bit string representing the local feature value and coordinates of two paired pixels (pixels A and B). Note that a value obtained by subtracting the luminance LB of the pixel B from the luminance LA of the pixel A, i.e., LA−LB, is defined as the luminance difference of the pixel pair.

The image information 101b is information about image data. For example, the storing unit 101 stores, as the image information 101b, image data of images Pic#1, #2, and so on. The above description discriminates between the reference image Pr and the query image Pq for the purpose of illustration; however, the following describes the case where a query image is designated from the images Pic#1, #2, and so on and images other than the query image are referred to as reference images.

The candidate table 101c stores therein information on individual feature points to be used in selecting feature points well-suited to feature value representation such as BRIEF. The candidate table 101c includes, for example, information represented in FIG. 10. FIG. 10 illustrates an example of the candidate table. The candidate table 101c of FIG. 10 stores the index n to identify each feature point; coordinates of individual feature points; absolute value vectors used in selecting feature points; and norms of the absolute value vectors. Note that the candidate table 101c is generated for each of the images Pic#1, #2, and so on. How to calculate the absolute value vectors and norms is described later.

The feature point table 101d is information about feature values of selected feature points. For example, the feature point table 101d includes information represented in FIG. 11. FIG. 11 illustrates an example of the feature point table. The feature point table 101d of FIG. 11 includes information associating identification information f used to identify each selected feature point, coordinates of the feature point; and the local feature value of the feature point. Note that the feature point table 101d is generated for each of the images Pic#1, #2, and so on.

Now let us refer back to FIG. 8. With respect to each of the images Pic#1, #2, and so on included in the image information 101b, the feature point selecting unit 102 selects feature points well-suited to feature value representation such as BRIEF. The feature value extracting unit 103 extracts the local feature value of each feature point selected by the feature point selecting unit 102. The image recognizing unit 104 uses the local feature values of the individual feature points extracted by the feature point selecting unit 102 to identify an image similar to a query image, and outputs the identified image as a result of the image recognition. The image similar to the query image is identified through, for example, the corresponding point searches and polling illustrated in FIGS. 6 and 7.

[Feature Point Selecting Method]

Figure 12:
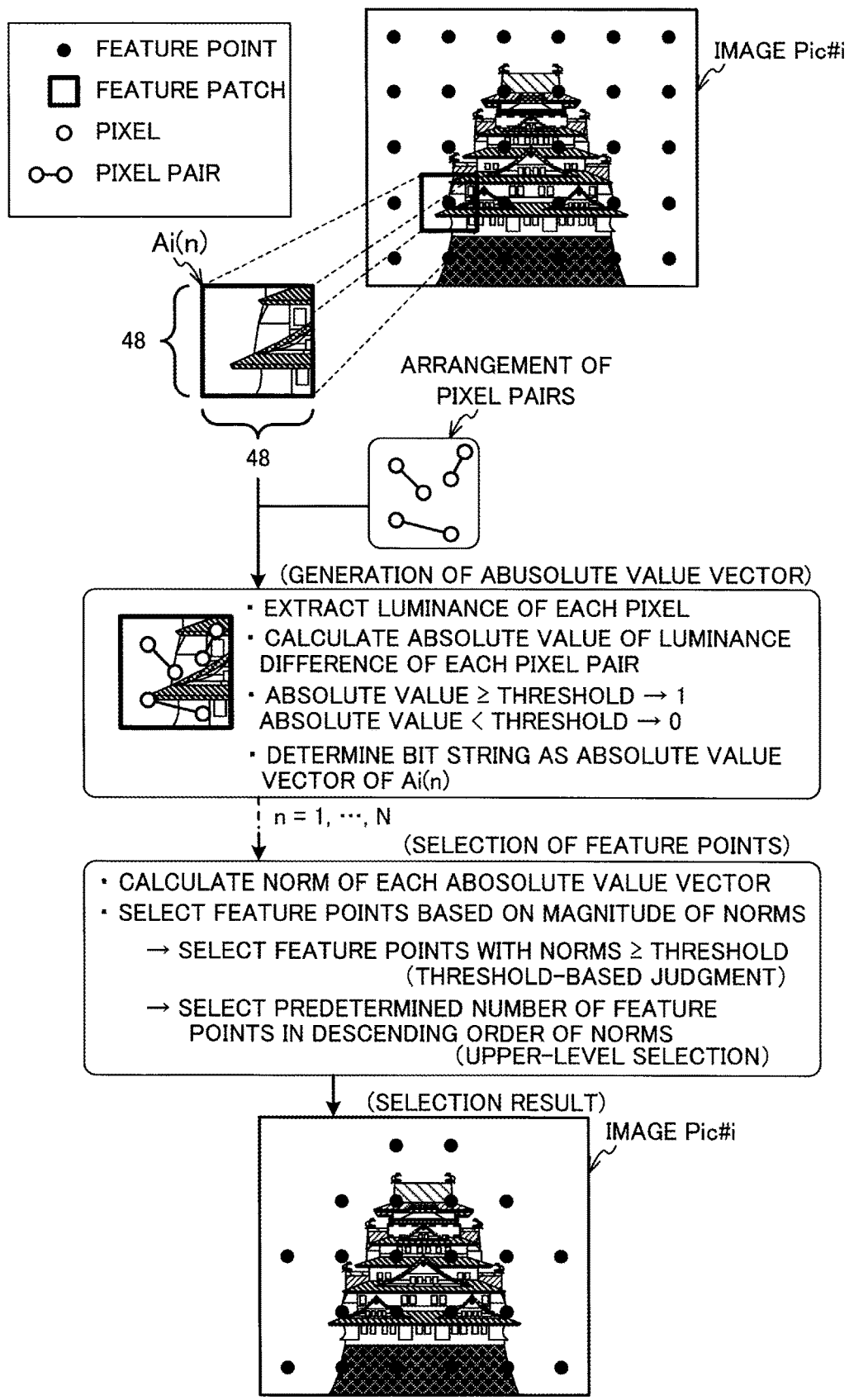
FIG. 12 illustrates a feature point selecting method according to the second embodiment.

Further explanation is given on the method used by the feature point selecting unit 102 to select feature points, with reference to FIG. 12. FIG. 12 illustrates the feature point selecting method according to the second embodiment. In the case of selecting feature points in an image Pic#i, the feature point selecting unit 102 distributes feature points in the image Pic#i at even intervals. For example, N feature points are arranged therein as feature point candidates. Referring to the pixel pair table 101a, the feature point selecting unit 102 sets a plurality of pixel pairs in a feature patch Ai(n) (n=1, 2, . . . , N) of each feature point. In addition, the feature point selecting unit 102 extracts the luminance of each pixel of the individual pixel pairs and then calculates an absolute value of the luminance difference of each pixel pair.

Further, the feature point selecting unit 102 generates a bit string corresponding to the plurality of pixel pairs, in which a corresponding bit value is set to if the calculated absolute value is greater than or equal to a threshold and to 0 if it is less than the threshold. Subsequently, the feature point selecting unit 102 determines the generated bit string as an absolute value vector and registers the absolute value vector in the candidate table 101c. The feature point selecting unit 102 also calculates the norm of the absolute value vector and registers it in the candidate table 101c. The norm represents the magnitude of the absolute value vector and is given as the number of 1's in the absolute value vector.

The feature point selecting unit 102 selects, amongst feature point candidates, feature points based on the magnitude of the norms. For example, the feature point selecting unit 102 selects feature points whose norms are greater than or equal to a threshold (threshold-based judgement). Alternatively, the feature point selecting unit 102 may select a predetermined number of feature points in descending order of the norms (upper-level selection). Selecting the feature points in such a manner eliminates feature points lying in, for example, flat and smooth image regions as illustrated in FIG. 12, thus enabling selection of feature points well-suited to feature representation such as BRIEF.

As for the threshold compared with each absolute value and the threshold compared with each norm, for example, simulations are preliminarily run using sample data to set these thresholds to values producing desired image search accuracy. In addition, the predetermined number of feature points selected by the upper-level selection strategy is set to a number less than N, which is confirmed by simulations or the like to produce desired image search accuracy.

(b-4) Processing Flows

Next described are flows of processing executed by the information processor 100.

[Feature Point Selection]

Figure 13:
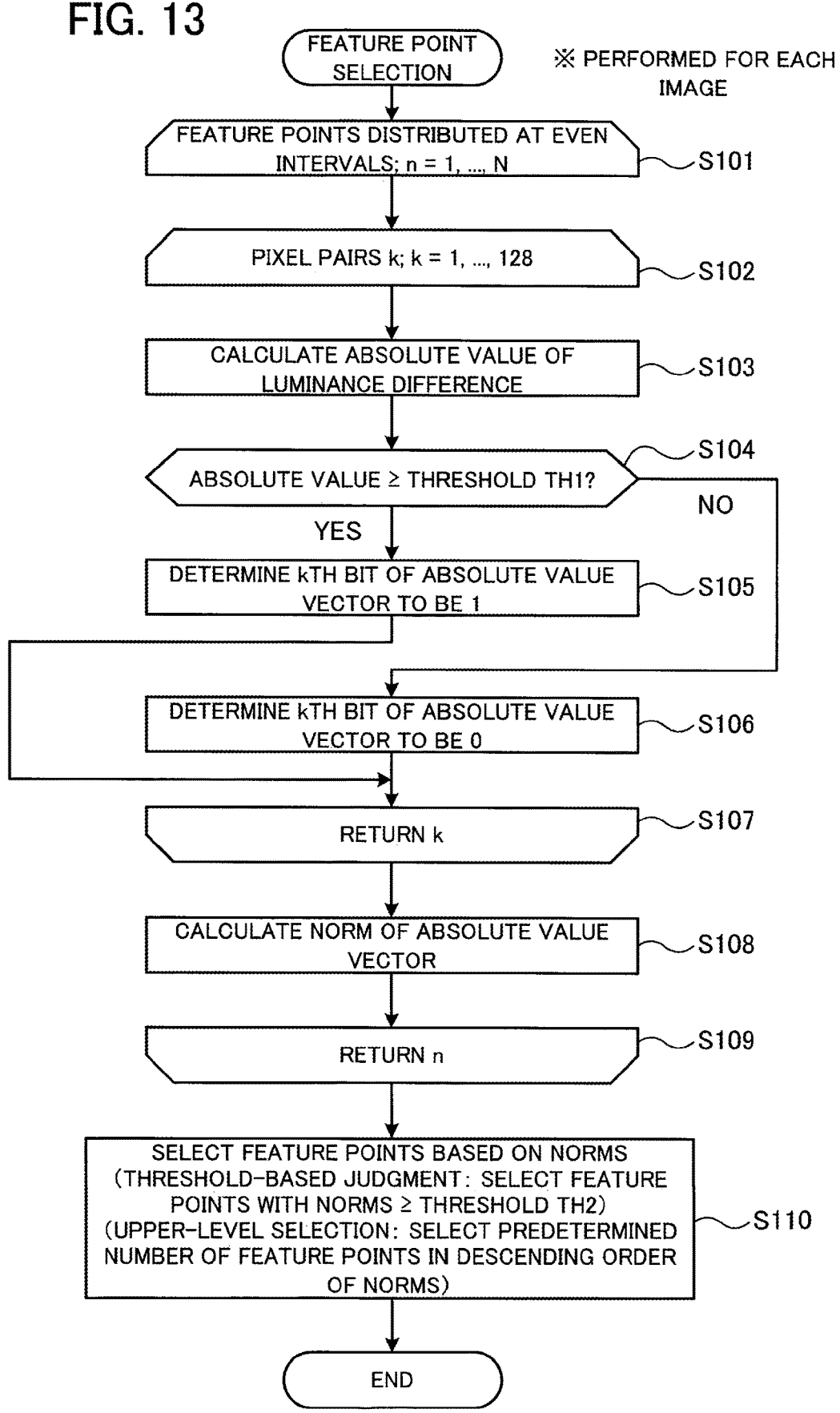
FIG. 13 is a flow diagram illustrating a flow of feature point selection according to the second embodiment.

First described is a process of the feature point selection, with reference to FIG. 13. FIG. 13 is a flow diagram illustrating a flow of the feature point selection according to the second embodiment. Note that the feature point selection of FIG. 13 is carried out for each image included in the image information 101b. Note that the case of the feature point selection being carried out for the image Pic#i is described next as an example for the purpose of illustration.

(Steps S101 to S109) The feature point selecting unit 102 distributes, as feature point candidates, N feature points in the image Pic#i at even intervals. Then, the feature point selecting unit 102 repeats a procedure from steps S101 to S109 (feature point-based procedure) while the index n is increased by 1 each time. When the feature point-based procedure for the $N^{th}$ feature point is completed, the process moves to step S110.

(Steps S102 to S107) Referring to the pixel pair table 101a, the feature point selecting unit 102 sets a predetermined number of pixel pairs (128 pairs in this example) in the feature patch Ai(n) defined based on the $n^{th}$ feature point. Then, the feature point selecting unit 102 repeats a procedure from steps S102 to S107 (pixel pair-based procedure) while the index k is increased by 1 each time. When the pixel pair-based procedure for the $128^{th}$ pixel pair is completed, the process moves to step S108.

(Step S103) The feature point selecting unit 102 acquires luminance values of the individual pixels of the $k^{th}$ pixel pair and then calculates an absolute value of the luminance difference.

(Step S104) The feature point selecting unit 102 determines whether the absolute value calculated in step S103 is greater than or equal to a threshold TH1. As for the threshold TH1, for example, simulations are preliminarily run using sample data in order to set the threshold TH1 to a value allowing selection of feature points well-suited to feature representation such as BRIEF. If the absolute value is greater than or equal to the threshold TH1 (the absolute value TH1), the process moves to step S105. If not, the process moves to step S106.

(Step S105) The feature point selecting unit 102 determines the $k^{th}$ bit of the absolute value vector to be 1. When step S105 is completed, the process moves to step S107.

(Step S106) The feature point selecting unit 102 determines the $k^{th}$ bit of the absolute value vector to be 0.

(Step S108) The feature point selecting unit 102 calculates the norm of the absolute value vector. Note that the norm of the absolute value vector represents the magnitude of the absolute value vector. For example, the norm of the absolute value vector is given as the number of 1's in the absolute value vector. The feature point selecting unit 102 registers the absolute value vector and the norm in the candidate table 101c.

As described above, each bit within the absolute value vector, corresponding to a pixel pair whose absolute value of the luminance difference is greater than or equal to the threshold TH1 is set to 1. Therefore, the norm of the absolute value vector corresponds to the number of pixel pairs with large absolute values of the luminance differences. If residing in a flat and smooth image region or an image region including fine lines, the feature patch Ai(n) includes a lot of pixel pairs with small absolute values of the luminance differences. The norm of the absolute value vector acquired for the feature patch Ai(n) in such an image region is small. That is, it is possible to use the norm of the absolute value vector as a criterion to evaluate whether the feature patch Ai(n) is well-suited to feature representation such as BRIEF.

(Step S110) The feature point selecting unit 102 selects feature points based on the norms registered in the candidate table 101c. For example, in the case of adopting the threshold-base judgment strategy, the feature point selecting unit 102 selects feature points whose norms are greater than or equal to a threshold TH2. As for the threshold TH2, for example, simulations are preliminarily run using sample data in order to set the threshold TH2 to a value allowing selection of feature points well-suited to feature representation such as BRIEF. On the other hand, in the case of adopting the upper-level selection strategy, the feature point selecting unit 102 selects a predetermined number of feature points (for example, N/2 feature points) in descending order of the norms.

The feature point selecting unit 102 registers information of the selected feature points (the identification information f and coordinates; see FIG. 11) in the feature point table 101d. At this stage, local feature values are not yet registered in the feature point table 101d. When step S110 is completed, the processing series illustrated in FIG. 13 ends.

[Feature Value Extraction]

Figure 14:
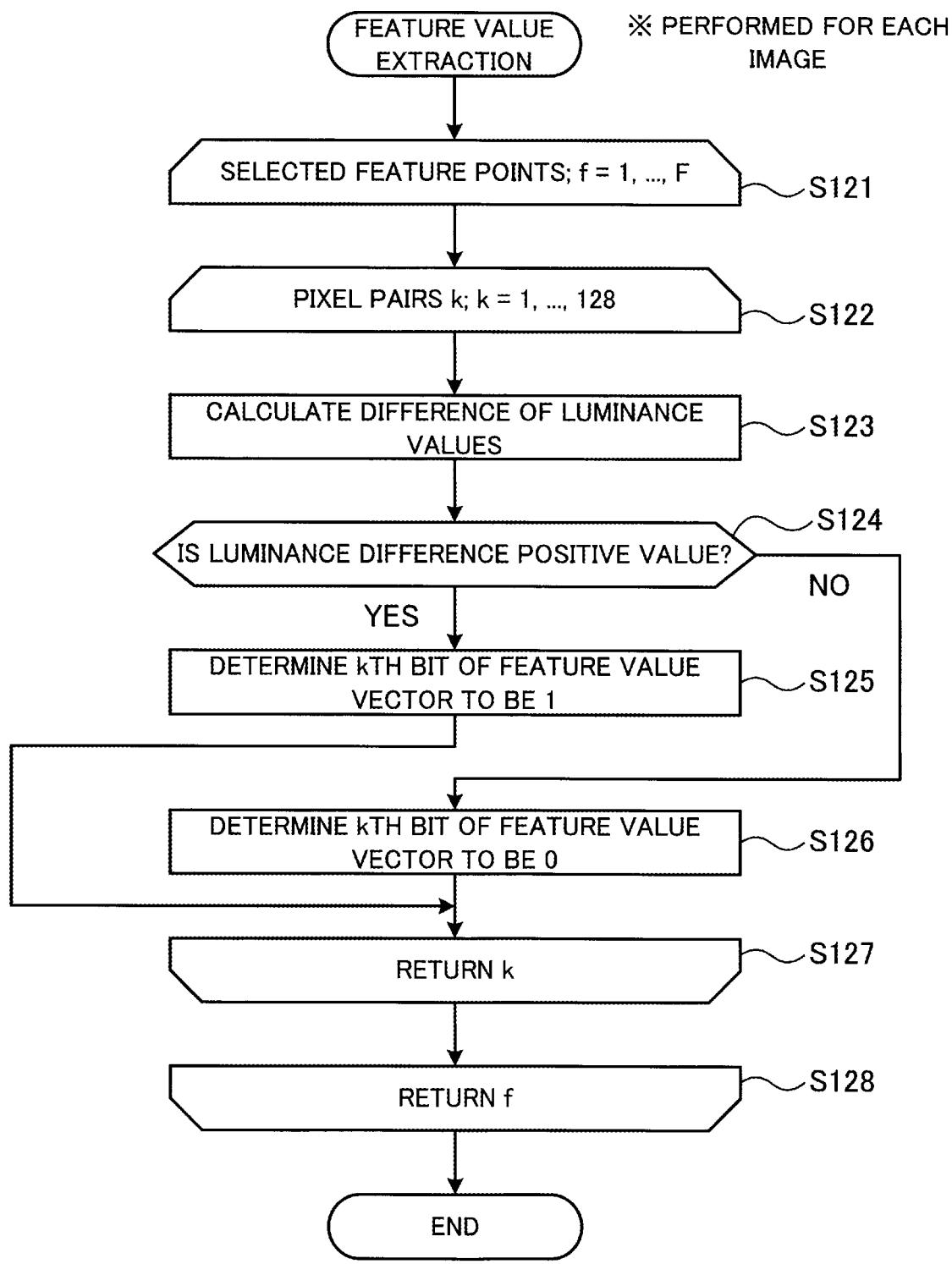
FIG. 14 is a flow diagram illustrating a flow of feature value extraction according to the second embodiment.

Next described is a process of the feature value extraction, with reference to FIG. 14. FIG. 14 is a flow diagram illustrating a flow of the feature value extraction according to the second embodiment. Note that the feature value extraction of FIG. 14 is carried out for each image included in the image information 101b. Note that the case of the feature value extraction being carried out for the image Pic#i is described next as an example for the purpose of illustration. Assume that F feature points have been selected for the image Pic#i by the feature point selecting unit 102.

(Steps S121 to S128) The feature value extracting unit 103 repeats a procedure from steps S121 to S128 (feature point-based procedure) while the index f is increased by 1 each time. Note that the index f is identification information used to identify each of the feature points selected by the feature point selecting unit 102 (selected feature points).

When the process reaches step S128, the feature value extracting unit 103 registers, in the feature point table 101d, a feature value vector (to be described later) as the local feature value. When the above feature point-based procedure for the $F^{th}$ feature point is completed, the processing series illustrated in FIG. 14 ends.

(Steps S122 to S127) Referring to the pixel pair table 101a, the feature value extracting unit 103 sets a predetermined number of pixel pairs (128 pairs in this example) in a feature patch defined based on the $f^{th}$ selected feature point. Then, the feature value extracting unit 103 repeats a procedure from steps S122 to S127 (pixel pair-based procedure) while the index k is increased by 1 each time. When the pixel pair-based procedure for the $128^{th}$ pixel pair is completed, the process moves to step S128.

(Step S123) The feature value extracting unit 103 acquires luminance values of the individual pixels of the $k^{th}$ pixel pair and then calculates the difference between the luminance values (luminance difference). In this regard, the luminance difference calculated by the feature point selecting unit 102 during the feature point selection may be held in the storing unit 101 and then reused by the feature value extracting unit 103 from the storing unit 101.

(Step S124) The feature value extracting unit 103 determines whether the luminance difference is a positive value. If the luminance difference is a positive value, the process moves to step S125. On the other hand, if the luminance difference is a negative value, the process moves to step S126. Note that if the luminance difference is 0, the process moves to step S125 in this example.

(Step S125) The feature value extracting unit 103 determines the $k^{th}$ bit of the feature value vector to be 1. When step S125 is completed, the process moves to step S127.

(Step S126) The feature value extracting unit 103 determines the $k^{th}$ bit of the feature value vector to be 0.

As described above, in the feature value extraction, the feature value vector is calculated for each of the F selected feature points ($F \le N$).

[Image Recognition]

Figure 15:
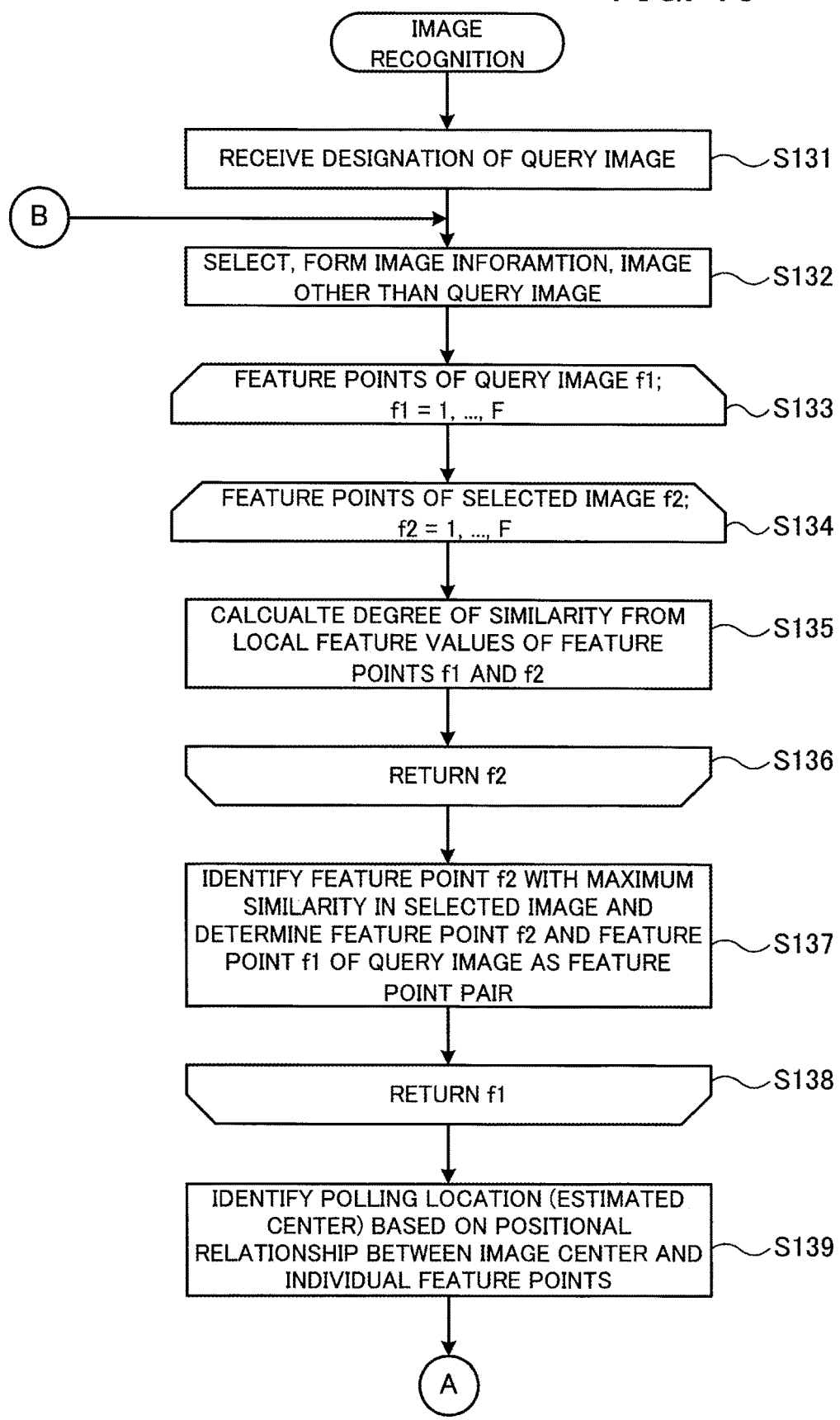
FIG. 15 is a first flow diagram illustrating a flow of image recognition according to the second embodiment.
Figure 16:
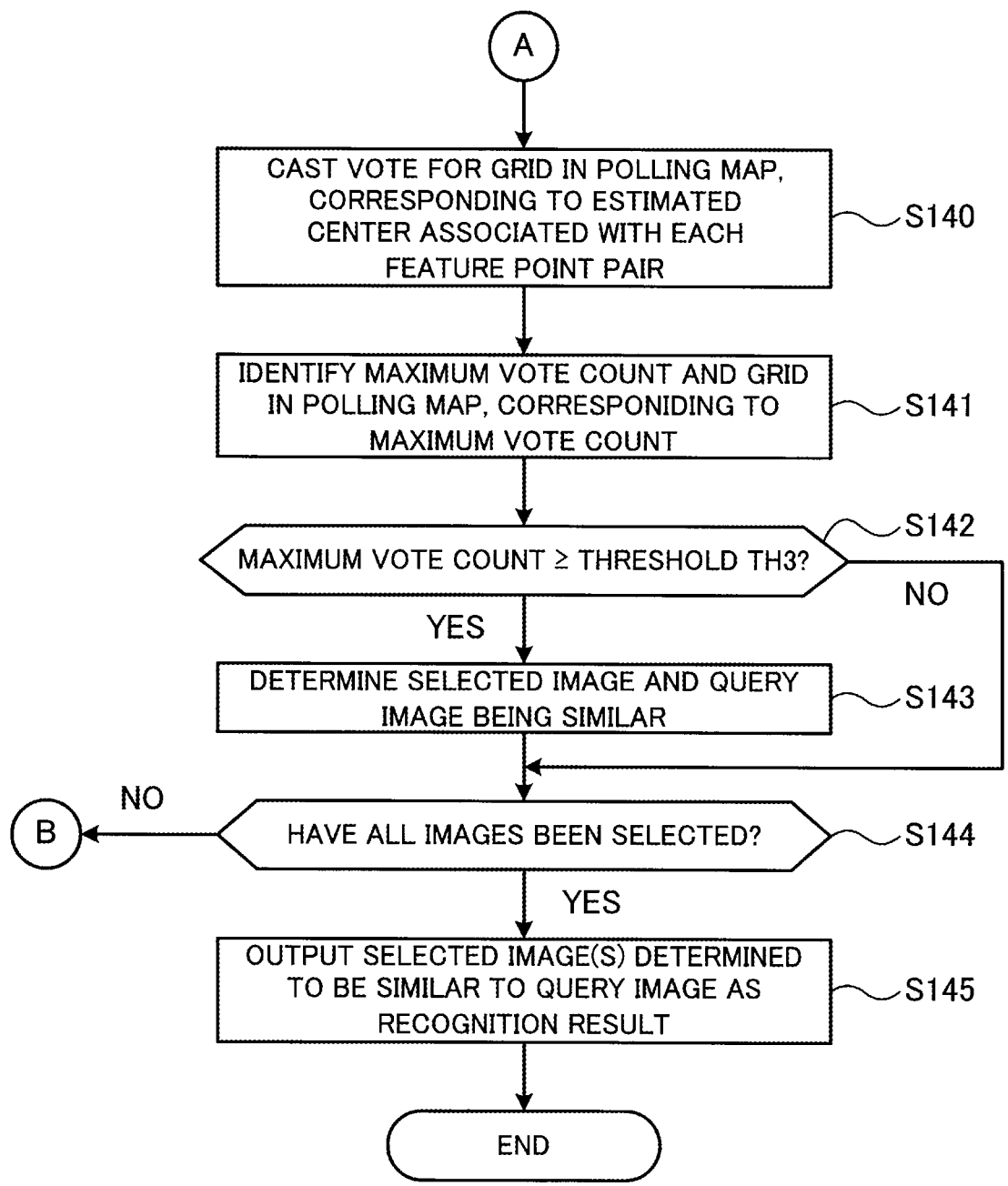
FIG. 16 is a second flow diagram illustrating the flow of the image recognition according to the second embodiment.

Next described is a process of image recognition, with reference to FIGS. 15 and 16. FIG. 15 is a first flow diagram illustrating a flow of the image recognition according to the second embodiment. FIG. 16 is a second flow diagram illustrating the flow of the image recognition according to the second embodiment.

(Step S131) The image recognizing unit 104 receives a designation of a query image. Note that the case where a query image is designated amongst the images Pic#1, #2, and so on included in the image information 101b and checked against the remaining images is described next as an example; however, a query image may be input from an external device (such as a camera or smartphone) via wired or wireless communication instead.

(Step S132) The image recognizing unit 104 selects, from the image information 101b, an image other than the query image (selected image).

(Steps S133 to S138) The image recognizing unit 104 acquires, from the feature point table 101d, information on the $f1^{st}$ feature point (feature point f1) (f1=1, . . . , F) in the query image. Then, the image recognizing unit 104 repeats a procedure from steps S133 to S138 (feature point f1-based procedure) while the index f1 is increased by 1 each time. When the feature point f1-based procedure for the $F^{th}$ feature point is completed, the process moves to step S139.

(Steps S134 to S136) The image recognizing unit 104 acquires, from the feature point table 101d, information on the $f2^{nd}$ feature point (feature point f2) (f2=1, . . . , F) in the selected image. Then, the image recognizing unit 104 repeats a procedure from steps S134 to S136 (feature point f2-based procedure) while the index f2 is increased by 1 each time. When the feature point f2-based procedure for the $F^{th}$ feature point is completed, the process moves to step S137.

(Step S135) The image recognizing unit 104 acquires, from the feature point table 101d, local feature values of the feature points f1 and f2. In addition, the image recognizing unit 104 calculates the degree of similarity between the feature points f1 and f2 based on the individual local feature values of the feature points f1 and f2. For example, the image recognizing unit 104 makes a bit-by-bit comparison between a bit string representing the local feature value of the feature point f1 and a bit string representing the local feature value of the feature point f2. Then, the image recognizing unit 104 calculates, as the degree of similarity, the reciprocal of the number of bits that are different (i.e., distance) or the number of bits that are common between the two bit strings.

(Step S137) The image recognizing unit 104 identifies the feature point f2 with the maximum degree of similarity in the selected image. Then, the image recognizing unit 104 determines the identified feature point f2 of the selected image and the feature point f1 of the query image as a feature point pair.

(Step S139) Based on the positional relationship between the image center and the individual feature points, the image recognizing unit 104 identifies a polling location (estimated center) for each feature point pair (see FIG. 6).

(Step S140) The image recognizing unit 104 casts a vote for a grid in the polling map MP, corresponding to the estimated center associated with each feature point pair. That is, for the estimated center associated with each feature point pair, the image recognizing unit 104 increases a counter corresponding to the appropriate grid in the polling map MP by 1.

(Step S141) Referring to the vote count of each grid in the polling map MP, the image recognizing unit 104 identifies the maximum vote count and a grid corresponding to the maximum vote count (see FIG. 7).

(Step S142) The image recognizing unit 104 determines whether the maximum vote count is greater than or equal to a threshold TH3. As for the threshold TH3, for example, simulations are preliminarily run using sample data so that similar images are correctly recognized with a desired probability. If the maximum vote count is greater than or equal to the threshold TH3 (the maximum vote count≥TH3), the process moves to step S143. If not, the process moves to step S144.

(Step S143) The image recognizing unit 104 determines that the selected image and the query image are similar to each other.

(Step S144) The image recognizing unit 104 determines whether to have already selected all the images in the image information 101b other than the query image. If all the images have been selected, the process moves to step S145. On the other hand, if there is one or more unselected images, the process moves to step S132.

(Step S145) The image recognizing unit 104 outputs, as a result of the image recognition, one or more selected images determined to be similar to the query image. Note however that, if there is no selected image determined to be similar to the query image, the image recognizing unit 104 outputs information indicating absence of an image similar to the query image or failure in the image recognition. When step S145 is completed, the processing series illustrated in FIG. 16 ends.

The second embodiment has been described thus far. As described above, it is possible to reduce the risk of erroneous matching by narrowing down feature points distributed in an image to those well-suited to feature representation such as BRIEF. In addition, a reduction in the number of feature points reduces the processing load. As a result, the application of the technique according to the second embodiment above enables highly accurate, high-speed image recognition.

(c) Modifications

The method of distributing feature points in an image at even intervals as feature point candidates is introduced in the description above as an example; however, the arrangement of the feature point candidates is not limited to this case. For example, the arrangement may be modified in such a manner that feature points are randomly distributed in the image as the feature point candidates. Alternatively, a set of feature points selected by an edge extractor or corner detector (such as FAST) may be used as the feature point candidates.

The case where each absolute value vector and each feature value vector have the same bit count is introduced in the description above; however, the length of the absolute value vector may be set shorter than that of the feature value vector. For example, in generating each absolute value vector, only some of the corresponding pixel pairs (for example, only half of the pixel pairs) registered in the pixel pair table 101a are used, which allows shorter absolute value vectors to be used in the feature point selection. This modification contributes to a reduction in processing load involved in the feature point selection.

The case of performing image recognition against the query image using the images Pic#1, #2, and so on included in the image information 101b with no change is introduced in the description above; however, enlargement and reduction of the size of the images Pic#1, #2, and so on allows changes in the size to be taken into consideration. Introducing an image enlargement and reduction procedure elimi- nates the need of prestoring images in different sizes in the storing unit 101, thus allowing effective use of storage area.

The modifications described above are also well within the technical scope of the second embodiment.

It is possible to select feature points well-suited to image recognition processing using differences between pixels.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:

extracting a plurality of feature points from each of a first image and a second image to be compared with one another;

for each of the plurality of feature points in the first image and the second image, setting pixel pairs around said each feature point and evaluating stability of a feature value based on magnitudes, each of the magnitudes being a magnitude of a first difference between pixel values of one of the pixel pairs, extracting, based on a result of the evaluating, a combination of feature points with high stability of the feature values amongst the plurality of feature points in the first image and a combination of feature points with high stability of the feature values amongst the plurality of feature points in the second image;

for each of feature points included in the combinations extracted from the first image and the second image, calculating the feature value based on second differences, each of the second differences being a difference between pixel values of one of the corresponding pixel pairs, and outputting, as bit strings, the calculated feature values associated with the combination extracted from the first image and the calculated feature values associated with the combination extracted from the second image.

2. The non-transitory computer-readable storage medium according to claim 1, wherein:

the procedure further includes identifying, based on a distance between the bit string associated with the first image and the bit string associated with the second image, a correspondence relationship between the feature points included in the combination extracted from the first image and the feature points included in the combination extracted from the second image.

3. The non-transitory computer-readable storage medium according to claim 2, wherein:

the procedure further includes determining a degree of similarity between the first image and the second image, based on positional correspondence between each of the feature points included in the combination extracted from the first image and a corresponding one of the feature points included in the combination extracted from the second image.

4. The non-transitory computer-readable storage medium according to claim 1, wherein:

the extracting the combination includes extracting, as the combination, feature points with the feature values whose stability exceeds a predetermined threshold.

5. The non-transitory computer-readable storage medium according to claim 1, wherein:
the extracting the combination includes extracting, as the combination, a predetermined number of feature points selected in descending order of stability of the feature values.

6. A distance measuring method comprising:
extracting, by a computer, a plurality of feature points from each of a first image and a second image to be compared with one another;
for each of the plurality of feature points in the first image and the second image, setting, by the computer, pixel pairs around said each feature point and evaluating, by the computer, stability of a feature value based on magnitudes, each of the magnitudes being a magnitude of a first difference between pixel values of one of the pixel pairs,
extracting, by the computer, based on a result of the evaluating, a combination of feature points with high stability of the feature values amongst the plurality of feature points in the first image and a combination of feature points with high stability of the feature values amongst the plurality of feature points in the second image;
for each of feature points included in the combinations extracted from the first image and the second image, calculating, by the computer, the feature value based on second differences, each of the second differences being a difference between pixel values of one of the corresponding pixel pairs, and
outputting, by the computer, as bit strings, the calculated feature values associated with the combination extracted from the first image and the calculated feature values associated with the combination extracted from the second image.

7. A distance measuring apparatus comprising:
a memory configured to store a first image and a second image to be compared with one another; and
a processor configured to perform a procedure including:
extracting a plurality of feature points from each of the first image and the second image,
for each of the plurality of feature points in the first image and the second image, setting pixel pairs around said each feature point and evaluating stability of a feature value based on magnitudes, each of the magnitudes being a magnitude of a first difference between pixel values of one of the pixel pairs,
extracting, based on a result of the evaluating, a combination of feature points with high stability of the feature values amongst the plurality of feature points in the first image and a combination of feature points with high stability of the feature values amongst the plurality of feature points in the second image,
for each of feature points included in the combinations extracted from the first image and the second image, calculating the feature value based on second differences, each of the second differences being a difference between pixel values of one of the corresponding pixel pairs, and
outputting, as bit strings, the calculated feature values associated with the combination extracted from the first image and the calculated feature values associated with the combination extracted from the second image.

* * * * *